H. M. PFLAGER.
CAR TRUCK.
APPLICATION FILED MAR. 8, 1911.
1,032,500.
Patented July 16, 1912.
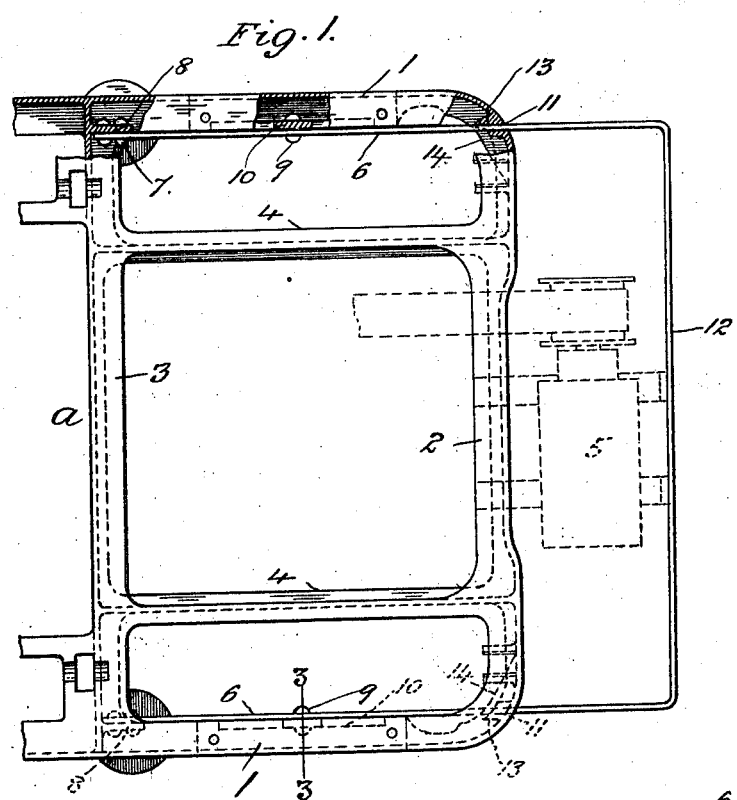
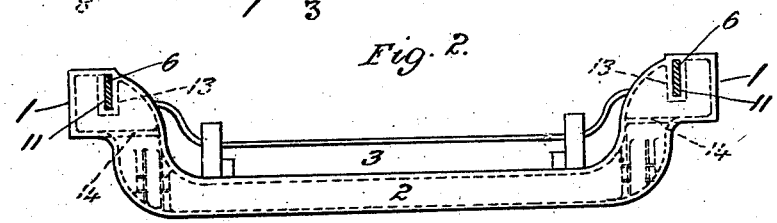
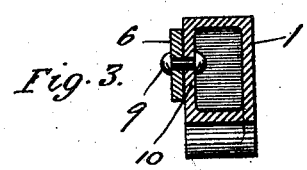
WITNESSES
W. L. Smith
B. S. Reid
INVENTOR
Harry M. Pflager
BY F. R. Cornwall, ATT'Y

UNITED STATES PATENT OFFICE.

HARRY M. PFLAGER, OF ST. LOUIS, MISSOURI, ASSIGNOR TO DOUBLE BODY BOLSTER COMPANY, OF ST. LOUIS, MISSOURI, A CORPORATION OF NEW JERSEY.

CAR-TRUCK.

1,032,500.   Specification of Letters Patent.   Patented July 16, 1912.

Application filed March 8, 1911. Serial No. 613,395.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a top plan view of the end portion of a metallic six-wheeled car truck (broken away at one side) adapted for the attachment thereto, according to my invention, of the axle-driven electric light generator (indicated by dotted lines); Fig. 2 is an end view thereof, omitting the generator; and Fig. 3 is a cross-section on an enlarged scale through one of the side members or wheeled-pieces of the frame, and one of the bars forming part of my invention, on line 3—3, Fig. 1.

This invention relates to an improvement in car trucks, and particularly to the means for attaching the axle-driven generator for electric lighting purposes to a six-wheeled or other car truck frame.

It has heretofore been the practice to use angle bars which pass over and project beyond the end member of the truck frame, said bars being secured in position to the vertical web of the axle-guards and to the adjacent cross-member or the transom and end member of the frame. Objection to the construction now in use is that the bars, when the car is rounding curves, come in contact with the fish-belly center sills and are liable to be bent or broken.

The object of my invention is to obviate this difficulty and simplify the construction of the parts so that they may readily be assembled and easily repaired.

In the drawings, *a* represents an end portion of a six-wheeled car truck frame which is preferably composed of cast steel integral throughout, comprising the two opposite side members or wheel-pieces 1 (broken away), the end member 2 uniting the wheel-pieces 1, the cross member or transom 3 opposite to the end member 2, and the axle-guards 4 intermediate to the wheel-pieces 1, and uniting the end member 2 and the transom 3.

In adapting the frame *a* for the attachment thereto of the axle driven electric light generator 5 (indicated by dotted lines in Fig. 1) according to my invention, I preferably substitute for the angle bars ordinarily fixed for the purpose to the axle-guards of the truck frame, two opposite horizontally arranged flat bars 6 which are respectively fixed flat-wise to the inner side of the corresponding wheel-piece 1, preferably, in the present case, as shown, at the inner end of each bar 6 by rivets 7 to the face of an upright bracket 8 which projects from the transom 3 between its top and bottom members and at a certain distance therefrom, by rivets 9, to the face of the middle vertical member 10 which unites the top and bottom members of the wheel-piece 1 together and is alined to the bracket 8, the bar 6 extending therefrom longitudinally through an opening 11 formed therefor through the end member 2 of the frame *a* to a suitable distance beyond the latter where the bars 6 are connected together, either at their outer ends by a cross-bar 12, as shown, or otherwise, as found most desirable for supporting the generator 5.

For reinforcing the frame *a* at and adjacent to, the openings 11 therethrough for the passage of the bars 6, I surround each opening 11, preferably on the inner face of the member of the frame *a* through which it is formed, with a rib or bead 13, and furthermore strengthen the frame *a* thereat beneath the opening 11 with a rib 14 which extends preferably diagonally or cornerwise between the end member 2 and the adjacent wheel-piece 1 at their junction to each other, whereby the loss of metal due to the openings 11 is compensated and the frame *a* adapted thereat to resist the stress and jar of the axle driven generator 5. Moreover, by fixing the bars 6 to the wheel-pieces 1, instead of to the axle-guards and thereby increasing the distance between them, more clearance is obtained between the center sills of the underframe in the operation of the truck and its appendages.

I claim:

In combination with a car truck having integrally formed side members, end member and transom member, a motor suspension frame having side members passing through apertures in said end member, said side members of the frame being secured at their inner ends to the transom and being secured between their ends to the side members of the truck, and supporting members for said frame formed on said end member of the truck and adapted to engage the side members of the frame.

In testimony whereof I hereunto affix my signature in the presence of two witnesses, this 3d day of March, 1911.

HARRY M. PFLAGER.

Witnesses:
HAL C. BELLVILLE,
M. P. SMITH.